(12) United States Patent
Sommerer et al.

(10) Patent No.: US 9,932,900 B2
(45) Date of Patent: Apr. 3, 2018

(54) THERMAL PROTECTION DEVICE FOR EQUIPMENT IN A TURBOMACHINE ENGINE COMPARTMENT

(71) Applicant: Airbus Operations (S.A.S.), Toulouse (FR)

(72) Inventors: Yannick Sommerer, Cornebarrieu (FR); Stéphanie Jeanmougin, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 345 days.

(21) Appl. No.: 14/530,013

(22) Filed: Oct. 31, 2014

(65) Prior Publication Data

US 2015/0139783 A1 May 21, 2015

(30) Foreign Application Priority Data

Oct. 31, 2013 (FR) .................................... 13 60716

(51) Int. Cl.
*F02C 7/18* (2006.01)
*F02C 7/24* (2006.01)
*F01D 25/12* (2006.01)
*F02C 7/32* (2006.01)

(52) U.S. Cl.
CPC ............... *F02C 7/18* (2013.01); *F01D 25/12* (2013.01); *F02C 7/24* (2013.01); *F02C 7/32* (2013.01); *F05D 2260/202* (2013.01); *Y02T 50/676* (2013.01)

(58) Field of Classification Search
CPC ............ F01D 25/12; B64D 33/08; F02C 7/18
See application file for complete search history.

(56) References Cited

U.S. PATENT DOCUMENTS

| 2,958,482 | A | * | 11/1960 | Summers, Jr. | ....... B64D 13/006 244/117 A |
| 4,351,150 | A | * | 9/1982 | Schulze | ................ F01D 17/085 60/226.1 |
| 4,504,030 | A | * | 3/1985 | Kniat | ................ H05K 7/20136 244/117 A |
| 5,012,639 | A | * | 5/1991 | Ream | .................... B64D 29/00 60/226.1 |

(Continued)

FOREIGN PATENT DOCUMENTS

| EP | 0 743 247 | 11/1996 |
| EP | 2 487 111 | 8/2012 |

(Continued)

OTHER PUBLICATIONS

French Preliminary Search Report for Application No. 1360716 dated Jul. 15, 2014.

*Primary Examiner* — Ninh H Nguyen
*Assistant Examiner* — Topaz L Elliott
(74) *Attorney, Agent, or Firm* — Jenkins, Wilson, Taylor & Hunt, P.A.

(57) ABSTRACT

A thermal protection device for equipment positioned in an engine compartment of an aircraft turbomachine is disclosed. The device comprises at least one heat shield arranged at least partially between the equipment and a thermally radiative wall of the engine compartment exposed to a heating source. The heat shield comprises an air-channeling elements connected to a cooling air source and configured to direct cooling air toward the equipment.

19 Claims, 3 Drawing Sheets

(56) References Cited

U.S. PATENT DOCUMENTS

| | | | | |
|---|---|---|---|---|
| 5,054,281 A * | 10/1991 | Mutch | .................... | B64D 33/08 |
| | | | | 138/39 |
| 5,063,476 A * | 11/1991 | Hamadah | .............. | H01L 23/467 |
| | | | | 257/E23.099 |
| 5,335,490 A * | 8/1994 | Johnson | .................... | F23R 3/20 |
| | | | | 60/740 |
| 5,655,359 A * | 8/1997 | Campbell | .............. | B64D 33/02 |
| | | | | 244/58 |
| 7,448,219 B2 * | 11/2008 | Bowers | .................. | F01D 25/12 |
| | | | | 137/520 |
| 7,665,310 B2 * | 2/2010 | Laborie | .................... | F01D 9/06 |
| | | | | 60/782 |
| 2007/0116978 A1 | 5/2007 | Starr | | |
| 2012/0204967 A1 * | 8/2012 | Sommerer | ............. | B64D 33/08 |
| | | | | 137/15.1 |
| 2012/0227375 A1 * | 9/2012 | Badcock | .................. | F02C 7/18 |
| | | | | 60/262 |

FOREIGN PATENT DOCUMENTS

EP  2 634 373  9/2013
JP  S57 13234  1/1982

\* cited by examiner

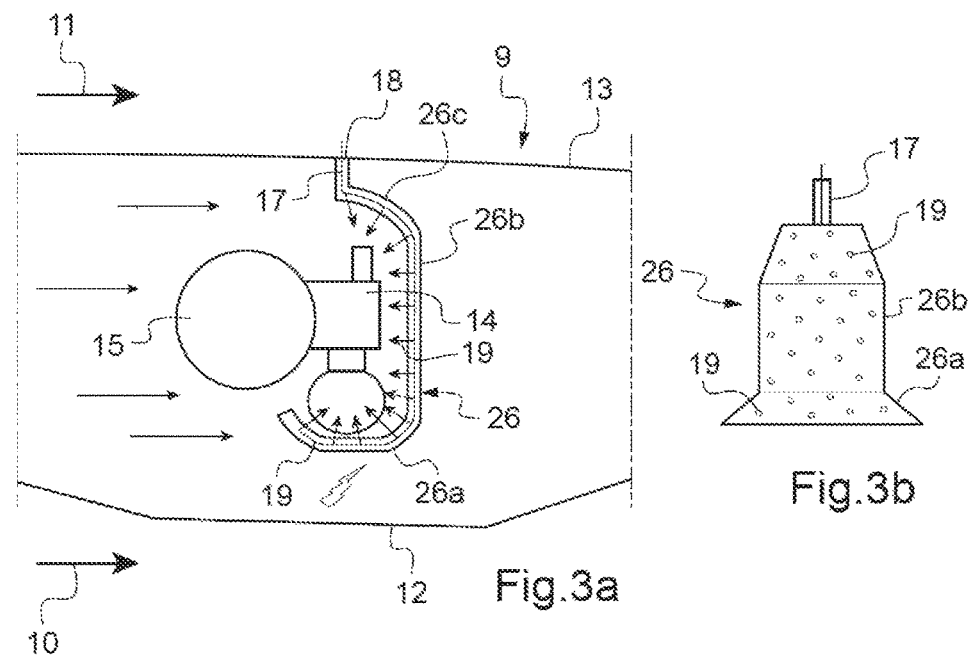
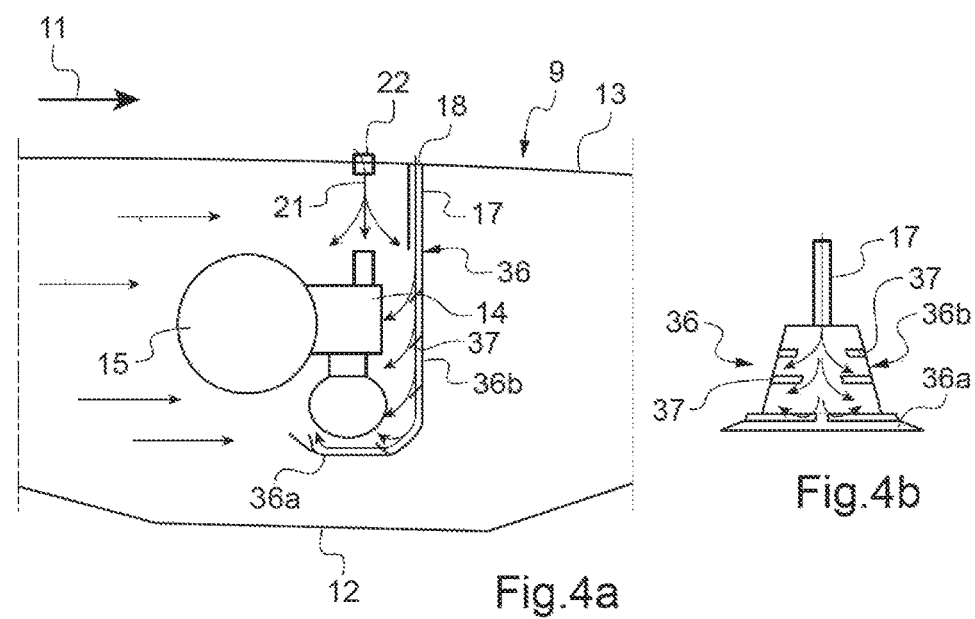

THERMAL PROTECTION DEVICE FOR EQUIPMENT IN A TURBOMACHINE ENGINE COMPARTMENT

The present invention relates to a thermal protection device for equipment positioned in an engine compartment of an aircraft turbomachine.

The engine compartment or "core" compartment of a bypass turbomachine is subjected on the inner side to the primary flow of hot air discharged from the combustion chamber and is subjected on the outer side to the secondary flow of cool air discharged from the fan. The thermal environment of the engine compartment of an aircraft turbomachine is therefore very restrictive due to the walls of the engine housing, which have very elevated temperatures on the primary flow side, generating a strong thermal radiation. This radiation is compensated for by a convective exchange with the flow of ambient air, which is sampled in order to ventilate the engine compartment and thus cools the piece (or pieces) of equipment arranged inside this compartment. This ambient air is often cooler than the equilibrium temperature of the equipment, however the convective exchange may be insufficient to ensure that the equipment remains below the maximum admissible temperature thereof.

The object of the present invention is to optimize the thermal protection of one or more pieces of equipment positioned in an engine compartment of a bypass turbomachine, for example valves for sampling air present in the "core" compartment of an aircraft turbojet engine.

To this end, the object relates to a thermal protection device for equipment positioned in an engine compartment of an aircraft turbomachine, comprising at least one heat shield arranged at least partially between said equipment and a thermally radiative wall of said engine compartment exposed to a heating source, said shield comprising air-channeling means connected to a cooling air source and suitable for directing said cooling air toward said equipment.

Thus, the radiative flow received by the equipment is weaker than the case in which there is no radiative protection or in which there is unventilated radiative protection. If, in addition, the temperature of the wall of the shield is lower than that of the equipment, the radiative flow received by the equipment tends to cool the equipment. In addition, the cooling of the equipment by convective exchange is improved with respect to an unventilated shield because the shield acts as a dedicated ventilation means. The cooling is active in a zone in which, in the case of unventilated screens or shields, the convection with the ambient air is very weak due to the geometric proximity of the screen and the equipment.

In accordance with a possible characteristic of the invention, said shield comprises at least one first part arranged between said equipment and said radiative wall and a second complementary part for ventilation of said equipment.

In accordance with another possible characteristic of the invention, said second part extends substantially transversely with respect to said radiative wall.

In accordance with a further possible characteristic of the invention, said channeling means of said second part are adapted to direct said cooling air over said equipment.

In accordance with a further possible characteristic of the invention, said channeling means comprise at least one air passage inside said shield and orifices in order to direct the air from said passage toward said equipment.

In accordance with a further possible characteristic of the invention, said orifices are distributed in a manner adapted to optimal ventilation of the equipment.

In accordance with a further possible characteristic of the invention, said channeling means comprise at least one plate for deflecting the cooling air toward said equipment and at least one conduit for guiding said cooling air over said plate.

In accordance with a further possible characteristic of the invention, said deflector plate also comprises air-deflecting elements.

In accordance with a further possible characteristic of the invention, said shield is fixed to said equipment.

In accordance with a further possible characteristic of the invention, said shield is fixed to the nacelle of said turbomachine.

In accordance with a further possible characteristic of the invention, said shield is fixed to the housing of said turbomachine.

The invention also relates to a turbomachine comprising a thermal protection device as defined above.

Further characteristics and advantages of the invention will become clear from the following description of embodiments given merely by way of example and illustrated by the accompanying drawings, in which:

FIG. 3a is a schematic side elevation view, illustrating a second embodiment of a thermal protection device for equipment arranged inside the engine compartment;

FIG. 3b is a schematic front elevation view of the shield of the thermal protection device of FIG. 3a;

FIG. 4a is a schematic side elevation view, illustrating a third embodiment of a thermal protection device for equipment arranged inside the engine compartment;

FIG. 4b is a schematic front elevation view of the shield of the thermal protection device of FIG. 4a, and FIG. 5 is a front elevation view of the turbojet engine from FIG. 1, illustrating different angular zones.

Figure 1:
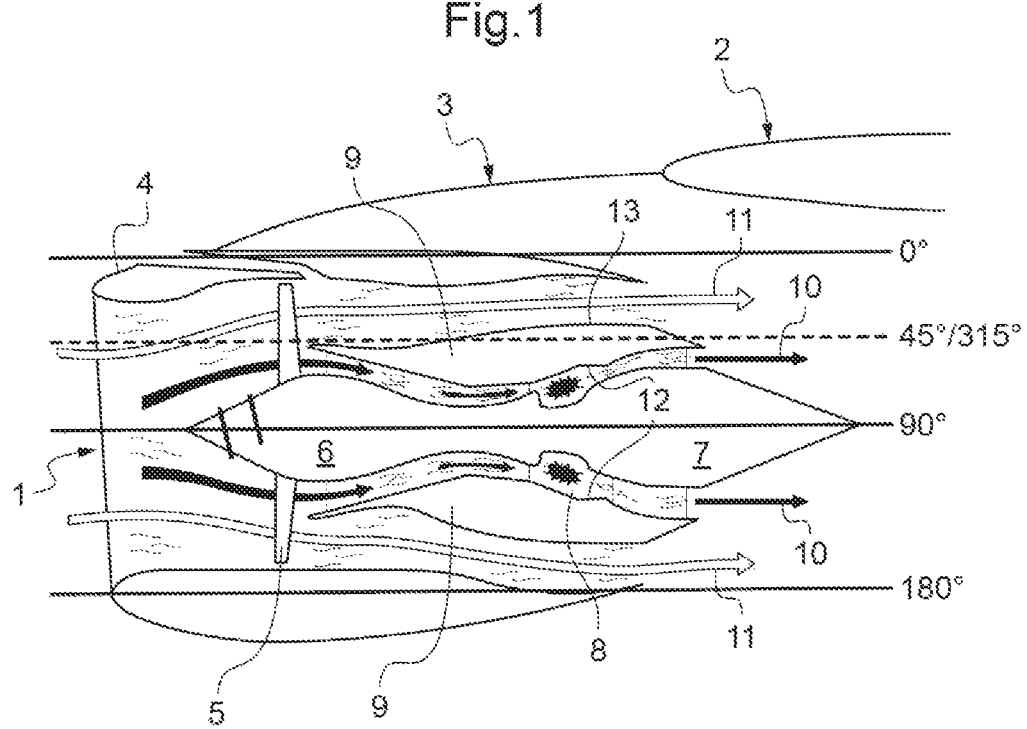
FIG. 1 is a schematic sectional view of a bypass turbojet engine, which shows the positioning of the engine compartment.

With reference to FIG. 1, a turbojet engine 1 is fixed to a wing 2 of an aircraft (not shown) by a mast 3. The turbojet engine 1 comprises a nacelle 4, which forms the casing, a fan 5, a compressor 6, a turbine 7 and one or more combustion chambers 8.

An engine compartment 9 is delimited by a housing of which the inner wall 12 on the primary flow side 10 is arranged close to the combustion chamber(s) 8, whereas the outer wall 13 on the secondary flow side 11 is cooled by fresh air.

Figure 2:
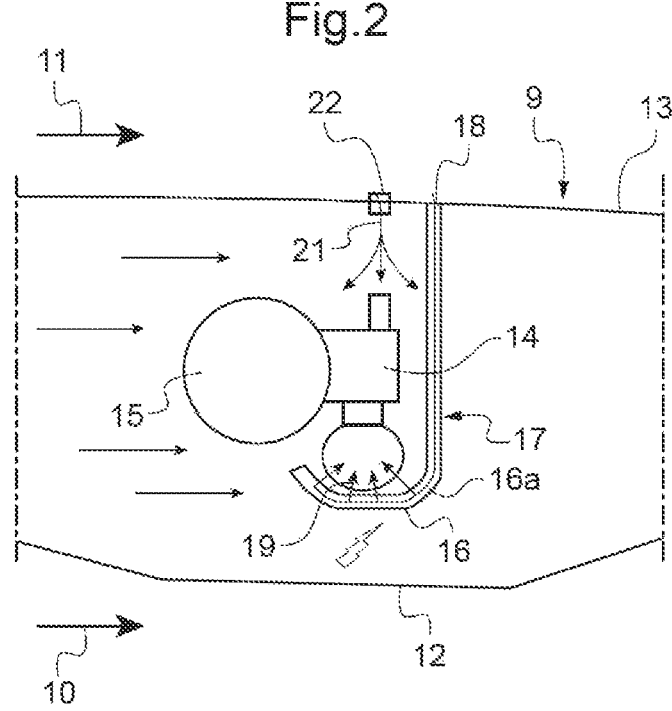
FIG. 2 is a schematic side elevation view, illustrating a first embodiment of a thermal protection device for equipment arranged inside the engine compartment.

Equipment 14, as shown in FIGS. 2 to 4, is arranged inside the engine compartment 9. This equipment 14 may be, for example, a set of one or more air-sampling valves over a channel system 15.

With reference to FIG. 2, the equipment 14 is protected thermally by the heating source constituted by the wall 12 of the "core" compartment 9 by a shield or screen 16. The distance between the equipment 14 and the shield 16 may be very reduced, for example a few millimeters to a few centimeters, due to the small radial dimensions of the engine compartment 9.

The shield 16 is hollow, that is to say it comprises a double skin delimiting in the interior a passage 16a, in which the cooling air can circulate. This cooling air is guided to the shield 16 by a channel 17 (or a plurality of said channels), which opens into the stream of secondary air 11 by means of an orifice formed in the wall 13. The screen 16 comprises, in the face thereof opposite the "hot" wall 12, orifices 19 arranged at strategic locations in order to direct the fresh cooling air toward the equipment 14 in a suitable manner. The number, shape and size of these orifices 19 are optimized according to need. The ventilated screen 16 surrounds the equipment 14 to a greater or lesser extent depending on the need for radiative protection and for ventilation.

Further thermal protection means can be combined with the ventilated thermal screen, such as a specific ventilation means 21 generated by sampling fresh air from the stream 11 via appropriate means 22.

During operation, the ventilated heat shield or screen 16 improves the radiative protection compared with an unventilated screen because, due to said ventilation with fresh air, the temperature of the wall of the screen 16 is lower than that of an unventilated screen. The radiative flow received by the equipment 14 is thus weaker than in the case of an unventilated screen. If, in addition, the temperature of the wall of the screen 16 is lower than that of the equipment 14, the radiative flow received by the equipment 14 will have a tendency to cool said equipment.

In addition, the cooling of the equipment 14 by convective exchange is improved compared with an unventilated screen because the screen 16 acts as a dedicated ventilation means. The cooling is active in a zone in which, in the case of unventilated screens, the convection with ambient air is very weak due to the geometric proximity of the screen and of the equipment.

In a variant as shown in FIGS. 3a and 3b, the screen 26 can be formed by a first part 26a arranged between the equipment 14 and the "hot" wall 12, a second part 26b which extends the length of the equipment 14, and a third part 26c, which more or less covers the top of the equipment 14, opposite the first part 26a. This variant makes it possible to obtain a screen that surrounds the equipment 14 as closely as possible. The three parts 26a, 26b, 26c have the same structure, that is to say they are formed by a double skin, in the interior of which the cooling air can circulate in one or more passages. The orifices 19 in the three parts 26a, 26b and 26c (FIG. 3b) are turned toward the equipment and are distributed so as to ensure optimal ventilation of this equipment. These orifices are distributed for example homogenously and identically over the entire surface of the parts 26a, 26b and 26c.

In a variant, the orifices 19 can be distributed solely in particular zones of the surface of the screen 26 corresponding to the specific parts of the equipment 14 to be ventilated.

During operation, the screen 26 thus performs a dedicated ventilation function, cooling the most sensitive part(s) of the equipment 14, which are positioned opposite the "hot" wall 12, so as to reduce the radiation. The ventilated screen 26 thus combines the two thermal protection systems by playing the joint role of radiative protection and dedicated ventilation cooling. In addition, in these cases, it is possible to distribute the cooling, depending on the need of the equipment 14, to the most effective locations.

Another variant of the heat protection shield or screen is illustrated in FIGS. 4a and 4b.

In accordance with this variant, the screen 36 comprises deflector plates, along which the fresh cooling air sampled into the secondary flow 11 is guided by the channel(s) 17 via the orifice(s) 18.

More precisely, the screen 36 comprises a first deflector plate 36a, which, similarly to the first part 26a, is arranged between the equipment 14 and the "hot" wall 12 of the engine compartment 9. This first plate 36a is extended by a second deflector plate 36b, which extends transversely with respect to the wall 12 so as to provide a radiative shield with respect to the housing, which is hot to the rear of the engine. The plate 36a is curved and is connected to the plate 36b.

The channel(s) 17 for guiding air open out in the vicinity of an edge of the second plate 36b opposite the curved zone of the plate 36a. The air is guided by the channel(s) 17 over the face of the plates 36a and 36b turned toward the equipment 14.

The plates have sizes and shapes suitable for distributing the cooling air in accordance with a distribution adapted to the effective ventilation of the equipment 14. As shown in FIG. 4b, the plates 36a and 36b may have a trapezoidal outline shape. The second plate 36b is connected to the channel(s) 17 of the small side of the trapezium and are located in the same plane as said channel system. In this way, the air flows directly and quickest to the equipment 14. The first plate 36a is connected by the small side thereof to the large side of the second plate 36b. The plates 36a and 36b are not necessarily planar and may have curved shapes and/or rims in order to encase the equipment 14 to a greater or lesser extent.

Besides their shape, which is optimized to allow them to fully fulfill a deflector function, the plates 36a and 36b may carry deflector elements 37, which are distributed over the surface of the plates to as to promote a desired distribution of the cooling air toward the equipment 14. Similarly to the orifices 19, the deflector elements 37 are distributed homogenously or via zones in accordance with the parts of the equipment 14 that are to be ventilated.

During operation, the cooling air coming from the channel(s) 17 is channeled and deflected by the plates 36a and 36b to ensure adequate ventilation of the equipment 14.

As in the case of the embodiment of FIG. 2, the equipment 14 may also be ventilated in a specific manner at 21, from the side of the cool wall 13, thanks to an appropriate intake of air 22.

The ventilated screen 16, 26, 36 can be installed in a number of ways depending on the architecture retained for the ventilation of the engine compartment.

Figure 5:
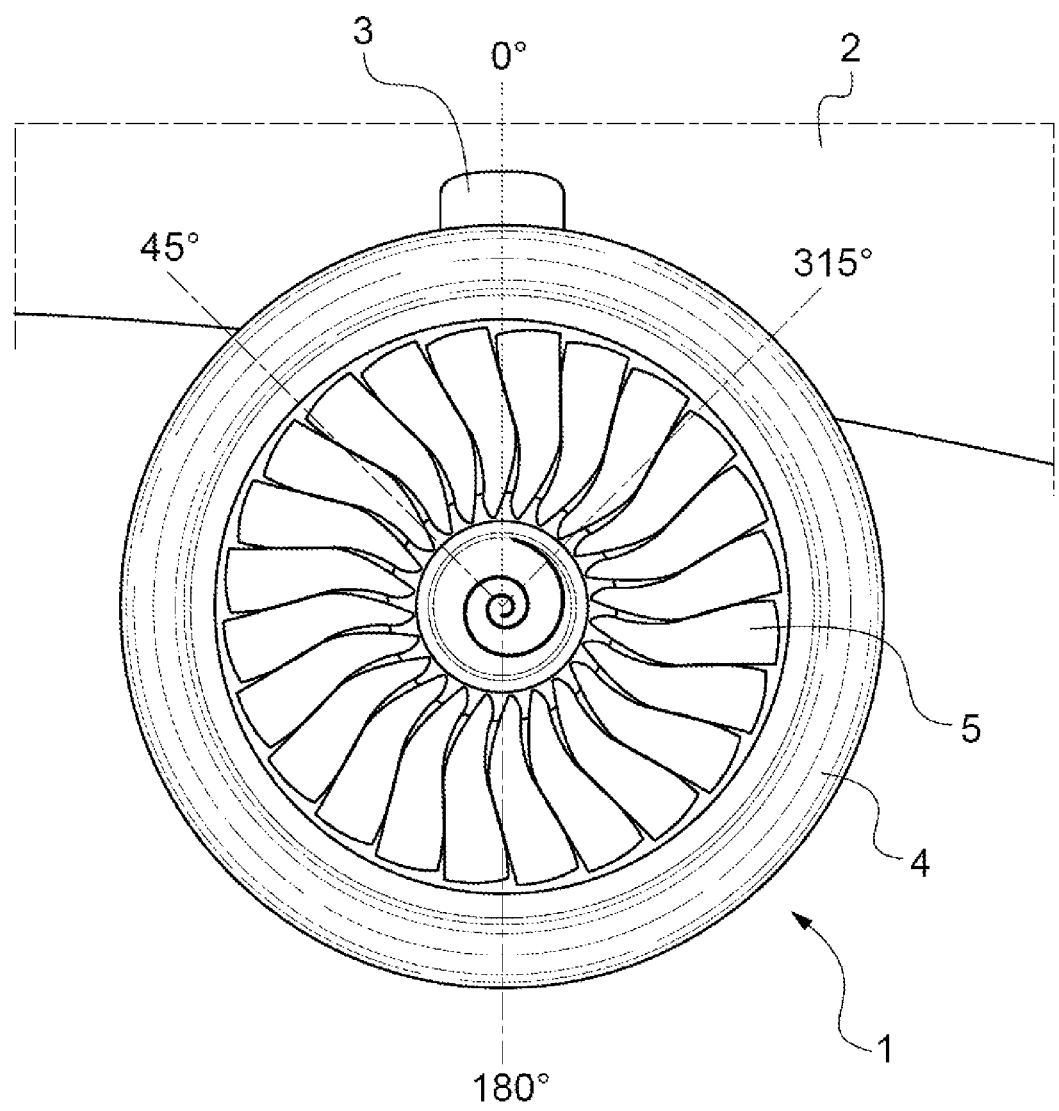

If the ventilation is ensured by the drawing of air from the secondary flow 11 of the turbojet engine with the aid of orifices in the wall 13 separating the engine compartment 9 from the secondary flow 11 and forming part of the nacelle 4 and:

If the equipment is located in a zone 315°-45° (0° being located at the top of the engine compartment 9, below the turbojet engine mast 3, as shown in FIG. 5), then the ventilated screen 16, 26, 36 can be fixed to the equipment 14 and connected by a flexible pipe to an orifice situated in the wall 13. This flexible pipe makes it possible to avoid disturbing the opening of the nacelle 4;

If the equipment is located in a zone 45°-315° (see FIGS. 1 and 5), then the ventilated screen 16, 26, 36 must be connected to the wall 13 of the nacelle 4 and the shape of the screen must not prevent the opening of the nacelle. This may have the disadvantage of restricting the shape of the screen and reducing the efficacy thereof.

More generally, the shield 16 is fixed to any component of the compartment of the turbomachine able to support said component.

If the ventilation of the entire zone is ensured by a common sampling point of air from the secondary flow 11 of the turbojet engine, generally formed by a primary pipe which is equipped with a flow regulation valve and to which the different ventilation pipes are connected, then the ventilated screen 16, 26, 36 can also be connected to this sampling point.

While at least one exemplary embodiment of the present invention has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein. In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. It should be understood that I wish to embody within the scope of the patent warranted hereon all such modifications as reasonably and properly come within the scope of my contribution to the art. Such modifications, substitutions and alternatives can be made without departing from the spirit and scope of the invention, which should be determined from the appended claims and their legal equivalents.

The invention claimed is:

1. A thermal protection device for equipment positioned in an engine compartment of an aircraft turbomachine, comprising:
    at least one heat shield arranged at least partially between the equipment and a wall of the engine compartment exposed to a heating source without encircling the equipment in any direction,
    wherein the shield comprises at least a first part arranged between the equipment and the wall, and a second part configured for ventilation of the equipment,
    wherein the shield comprises at least one air channel connected to a cooling air source, and
    wherein the shield is configured to direct cooling air away from the shield and toward the equipment.

2. The thermal protection device according to claim 1, wherein the second part extends substantially transversely with respect to the radiative wall.

3. The thermal protection device according to claim 2, wherein the second part is configured to direct cooling air over the equipment.

4. The thermal protection device according to claim 1, wherein the at least one air channel comprises a double wall with at least one air passage inside of the shield and orifices to direct the air from the at least one air passage toward the equipment.

5. The thermal protection device according to claim 4, wherein the orifices are distributed in a manner adapted to optimal ventilation of the equipment.

6. The thermal protection device according to claim 1, wherein the shield comprises at least one plate for deflecting the cooling air toward the equipment and at least one conduit for guiding the cooling air over the plate.

7. The thermal protection device according to claim 6, wherein the at least one plate comprises air-deflecting vanes.

8. The thermal protection device according to claim 1, wherein the shield is fixed to the equipment.

9. The thermal protection device according to claim 1, wherein the shield is fixed to a nacelle of the aircraft turbomachine.

10. The thermal protection device according to claim 1, wherein the shield is fixed to a housing of the aircraft turbomachine.

11. A turbomachine comprising a thermal protection device according to claim 1.

12. A thermal protection device for equipment positioned in an engine compartment of an aircraft turbomachine, comprising:
    at least one heat shield arranged at least partially between the equipment and a wall of the engine compartment exposed to a heating source,
    wherein the shield comprises at least one air channel connected to a cooling air source and configured to discharge cooling air away from the shield and toward the equipment, and
    wherein the shield comprises at least one plate for deflecting the cooling air toward the equipment and the at least one plate comprises air-deflecting vanes.

13. The thermal protection device according to claim 12, wherein the shield comprises at least one first part arranged between the equipment and the radiative wall and a second complementary part for ventilation of the equipment.

14. The thermal protection device according to claim 13, wherein the second part extends substantially transversely with respect to the radiative wall.

15. The thermal protection device according to claim 14, wherein the second part is configured to direct cooling air over the equipment.

16. A thermal protection device for equipment positioned in an engine compartment of an aircraft turbomachine, comprising:
    at least one heat shield arranged at least partially between the equipment and a wall of the engine compartment exposed to a heating source, without encircling the equipment in any direction,
    wherein the shield comprises at least one air channel connected to a cooling air source and configured to discharge cooling air away from the shield and toward the equipment,
    wherein the at least one air channel comprises a double wall with at least one air passage inside of the shield and orifices to direct the air from the at least one air passage toward the equipment, and
    wherein the orifices are distributed to optimal ventilation of the equipment.

17. The thermal protection device according to claim 16, wherein the shield comprises at least one first part arranged between the equipment and the radiative wall and a second complementary part for ventilation of the equipment.

18. The thermal protection device according to claim 17, wherein the second part extends substantially transversely with respect to the radiative wall.

19. The thermal protection device according to claim 18, wherein the second part is configured to direct cooling air over the equipment.

* * * * *